United States Patent [19]

Koester

[11] 4,089,450

[45] May 16, 1978

[54] MANUAL FILM RETRIEVAL

[75] Inventor: Richard H. Koester, Rochester, N.Y.

[73] Assignee: The Singer Company, New York, N.Y.

[21] Appl. No.: 758,276

[22] Filed: Jan. 10, 1977

[51] Int. Cl.² ...................... B65H 17/26; G03B 21/00
[52] U.S. Cl. .................................... 226/127; 226/108; 226/143; 226/154; 353/95; 353/122
[58] Field of Search ........................... 353/95, 96, 122; 226/50, 108, 127, 143, 154; 352/129, 124; 40/86 A, 106.1

[56] References Cited

U.S. PATENT DOCUMENTS 1,553,906  9/1925  Marette ................................ 352/129
2,941,737  6/1960  Jones .................................... 242/209

Primary Examiner—Harry N. Haroian
Attorney, Agent, or Firm—Charles R. Lewis

[57] ABSTRACT

Apparatus whereby a filmstrip operator can conveniently reestablish the engagement between a sprocket and an overdriven filmstrip in a filmstrip projector. The projector operator manipulates a thumb wheel to cause a roller to come into contact with a surface portion of the filmstrip, and to cause the roller to rotate thereby causing longitudinal displacement of the filmstrip in a film track. The trailing edge of the filmstrip is displaced towards the sprocket to facilitate reengagement of the filmstrip with the sprocket.

9 Claims, 4 Drawing Figures

MANUAL FILM RETRIEVAL

BACKGROUND OF THE INVENTION

1. Field of the Invention

The present invention relates to filmstrip projectors and more specifically to apparatus whereby a projector operator can conveniently cause longitudinal displacement of an overdriven filmstrip to reestablish engagement between the filmstrip and a filmstrip incrementing sprocket.

2. Description of the Prior Art

Conventional filmstrip projectors utilize a sprocket to increment the filmstrip on a frame by frame basis thru the projector. Typically, equally spaced pins extending radially from the sprocket engage complimentary spaced perforations on the margins of the filmstrip. Incremental rotation of the sprocket causes incremental longitudinal displacement of the filmstrip. Occasionally, the filmstrip is incremented until the trailing edge of the filmstrip loses engagement with the sprocket. This condition is defined herein as overdriving. Frequently, overdriving occurs when an inexperienced person operates the projector. In order to reestablish the engagement between the trailing edge of the filmstrip and the sprocket, it is necessary to gain access to the interior portions of the projector and manually displace the filmstrip to affect reengagement.

The present invention provides a means whereby a projector operator may conveniently cause displacement of the trailing edge of the filmstrip to affect the reengagement of the overdriven filmstrip and the sprocket.

SUMMARY OF THE INVENTION

Apparatus for establishing engagement between a filmstrip sprocket and an overdriven filmstrip includes a roller pivotable between an operative position and an inoperative position. In the operative position the roller is pivoted into contact with a surface portion of the filmstrip and in the inoperative position the roller is pivoted out of contact with the filmstrip. Projector operator manipulatable means are provided whereby the roller may be conveniently pivoted into the operative position and rotated to cause longitudinal displacement of the filmstrip to facilitate engagement between the filmstrip and the film sprocket.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several views, and wherein.

DESCRIPTION OF THE PREFERRED EMBODIMENT

Figure 1:
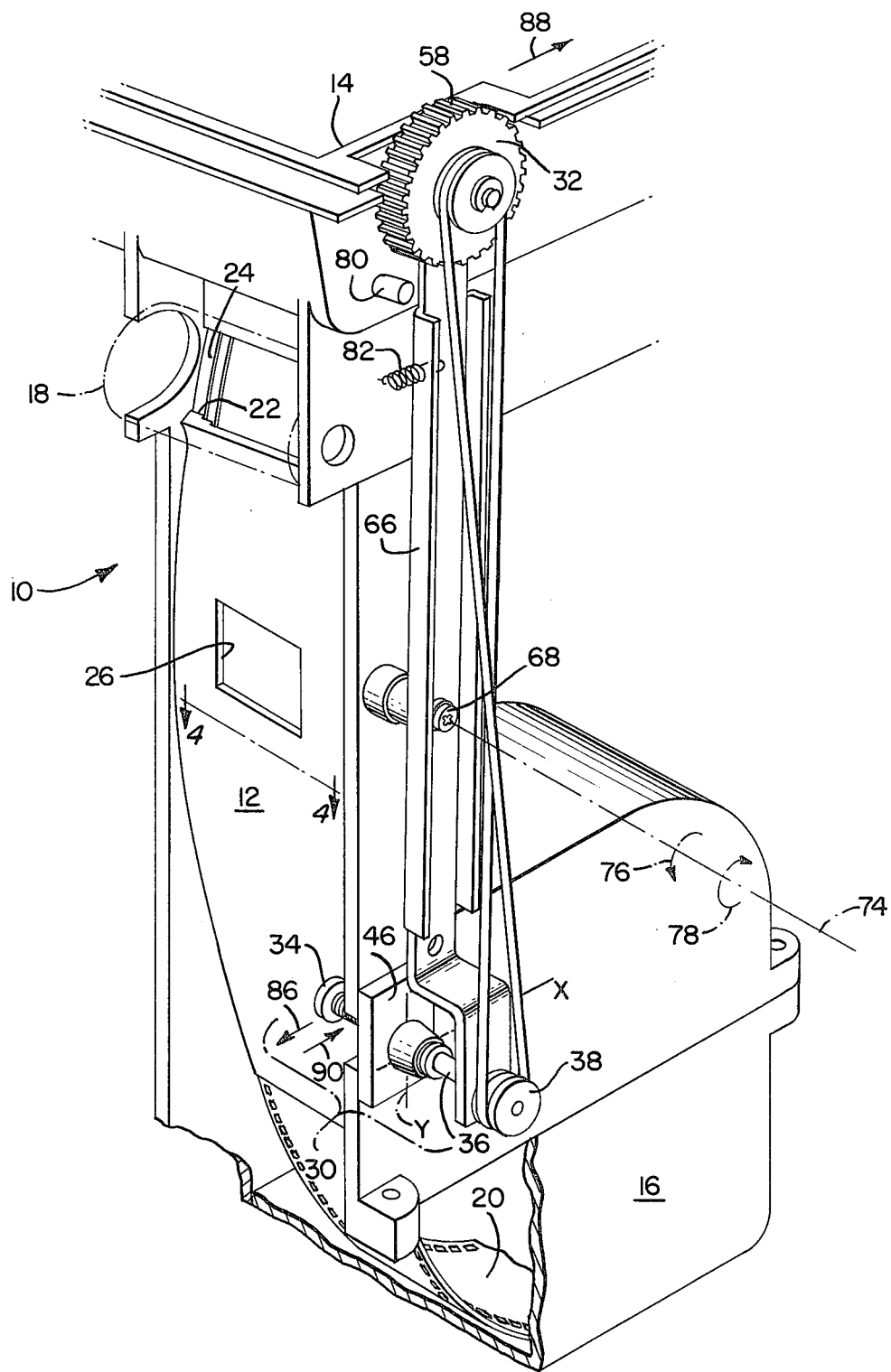
FIG. 1 is a fragmentary perspective of a film guide and support assembly incorporating the present invention.

The preferred embodiment of the present invention may be incorporated into a filmstrip projector of the type having a film guide and support assembly. An exemplary film guide and support assembly 10 suitable for use with the present invention is shown in fragmentary perspective in FIG. 1. The assembly 10 includes a curved, vertically aligned film track 12 connecting a cartridge receiving cavity 14 (partially shown) at the top of the film track 12 with a film accumulating chamber 16 (partially shown) at the bottom of film track 12. A film drive sprocket 18, schematically represented by a broken line cylinder in FIG. 1, is located adjacent the film track 12.

Figure 4:
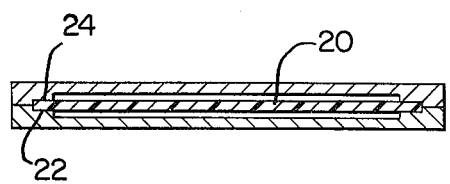
FIG. 4 is a cross-section view of a film track viewed in the direction indicated by the arrows of line 4—4 in FIG. 1.

The film track 12 provides support for a filmstrip 20 (shown issuing from the bottom of the film track 12 in FIG. 1) during projection. A transverse cross section view of the film track 12 is shown in FIG. 4. The film track 12 includes a first guide surface 22 spaced apart from and substantially parallel to a second guide surface 24. The film 20 is disposed in the space defined between the first guide surface 22 and the second guide surface 24. The film track 12 including an aperture 26 formed in the first guide surface 22 in registration with a larger opening (not shown) is used to project an image on the filmstrip 20 located in the aperture 26 onto a viewing screen (not shown). Suitable projection means are disclosed in copending patent application Ser. No. 724,881, filed Sept. 20, 1976, and assigned to the assignee of the present invention. The disclosure of this patent application is incorporated herein.

The cartridge receiving cavity 14 is adapted to receive a filmstrip cartridge (not shown). The cartridge may be the type described in co-pending application Ser. No. 724,875, filed Sept. 20, 1976, and may be latched into place by means of a latch described in co-pending application Ser. No. 724,882, filed Sept. 20, 1976.

The film accumulating chamber 16 is located adjacent to the bottom of the film track 12. As the filmstrip 20 is incremented down the film track 12 it accumulates in the chamber 16.

The filmstrip sprocket 18 is of conventional design and it includes a plurality of equally spaced radially extending pins (not shown) adapted to engage the serial margin perforations located on each side of the conventional filmstrip 20. The film sprocket 18 may be driven by conventional automatic or manual driving means.

The filmstrip 20 is threaded into the film guide and support assembly 10 by inserting a filmstrip cartridge into the cartridge receiving cavity 14 and latching the cartridge into place. The filmstrip 20 is advanced out of the filmstrip cartridge in accordance with means associated with the filmstrip cartridge and described in the above referenced co-pending patent application, Ser. No. 724,875, filed Sept. 20, 1976. The leading edge of the filmstrip is advanced until it engages the filmstrip sprocket 18. Incrementing of the filmstrip sprocket 18 causes the filmstrip 20 to advance down the film track 12 and past the aperture 26 for frame by frame projection of the images on the filmstrip 20. As the filmstrip 20 progresses down the film track 12 the leading edge of the filmstrip 20 as well as the projected portions of the filmstrip 20 collect in the film accumulating chamber 16. After the projection of the filmstrip 20 is complete, the film sprocket 18 drive is reversed and the filmstrip 20 returned to the filmstrip cartridge.

As occasionally occurs during filmstrip projection, the filmstrip 20 may be inadvertently advanced until the cartridge is empty and the trailing edge of the filmstrip 20 disengages from the film sprocket 18. This condition is referred to as "overdriving" the filmstrip 20, and usually occurs when the projector operator is inexperienced. It is difficult for an inexperienced projector operator to reestablish engagement between the filmstrip sprocket 18 and the trailing edge of the filmstrip 20 because the operator must open or otherwise gain access to the interior of the projector and manually manipulate the filmstrip 20 to cause the trailing edge of the filmstrip 20 to engage the film sprocket 18.

The present invention provides a means for a projector operator to conveniently move the trailing edge of the overdriven filmstrip 20 along the film track 12 to reengage the filmstrip 20 with the film sprocket 18. The present invention includes a roller assembly 30 coupled to a manipulatable thumb wheel 32 by intermediate structure described below. A simple manual manipulation of the thumb wheel 32 by the projector operator will cause the filmstrip 20 to move up the film track 12 to reengage the film sprocket 18 in a manner described below.

The roller assembly 30 includes a roller 34 secured to one end of an axle 36 and a pulley 38 secured to the other end of an axle 36. The periphery of the roller 34 is preferably fabricated from a resilient elastomer such as neoprene or other suitable material. In the preferred embodiment, the roller 34 has a solid plastic hub portion and an elastomer rim. The elastomer is selected for a coefficient of friction sufficiently high to cause lengthwise displacement of the filmstrip 20 along the film track 12 when the roller is rotated against the filmstrip 20.

Figure 2:
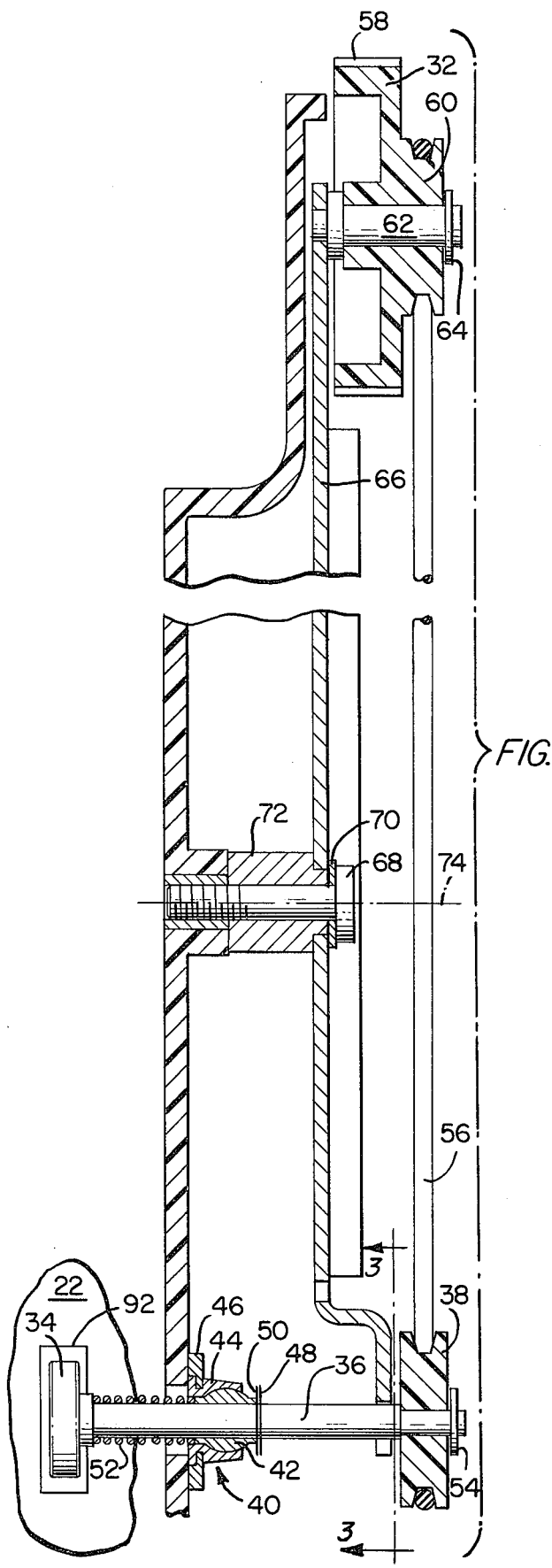
FIG. 2 is front cross-sectional elevation view of selected structure illustrated in FIG. 1.

The axle 36 is supported intermediate its ends by a bearing 40 which includes a spherical portion 42 (FIG. 2) and a complimentary support portion 44. The spherical portion 42 is slidably mounted on the axle 36 and the complimentary support portion 44 is secured to a mounting plate 46. The axle 36 is free to rotate in the bearing 40 and free to translate along its longitudinal axis relative to the spherical portion 42. Also, the axle 36 is free to pivot relative to the X-Y plane (FIG. 1) within limits determined by structure described below.

The position of the axle 36 and the roller 34 attached thereto is adjustable to place the roller 34 in registration with an access port 92 (FIG. 2) formed in the guide surface 22. The roller 34 position is determined by a "C" clip 48 mounted in a peripheral groove (not shown), one or more spacer washers 50, and a helical coil spring 52 in compression mounted on the axle 36 between the roller 34 and the bearing 40. The position of the roller 34 relative to the access port 92 is adjusted by adding or removing spacer washers 50.

The pulley 38 is secured to the other end of the axle 36, as by keying, splining, or pressing and restrained from axial translation by a "C" clip 54 mounted in a peripheral groove (not shown). The pulley 38 is adapted to entrain an elastomer drive belt 56.

The thumb wheel 32 includes a ridged periphery 58 and a pulley 60 integrally formed therewith on one side thereof. The pulley 60 is adapted to entrain the elastomer drive belt 56 which is also entrained by the pulley 38 as described above. The thumb wheel 32 is mounted on a stub shaft 62 for rotation relative thereto and is restrained from axial translation by a "C" clip 64 mounted in a pheripheral groove (not shown). The stub shaft 62 is secured to and extends outwardly from the upper end of a lever 66.

Figure 3:
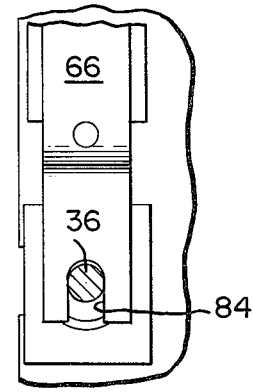
FIG. 3 is a partial cross-section view of structure illustrated in FIG. 2, viewed in the direction indicated by the arrows of line 3—3 in FIG. 2.

The lever 66 is pivoted intermediate its length by a threaded fastener 68, a washer 70, and a bushing 72, and is rotatable about axis 74 (FIG. 1) in a first direction as indicated by the arrow 76 and in a second direction as indicated by the arrow 78. A pin 80, secured to and extending laterally outward from supporting structure, limits the rotation of the lever 66 in the first direction (arrow 76). A helical coil spring 82 in tension has one end secured to the upper portion of the lever 66 and the other end secured to structure (not shown) and urges the link 66 in the first direction (arrow 76). As shown in FIG. 3, the lower end of the lever 66 is bifurcated to define a slot 84. The lever 66 is so positioned that the bifurcated end of the lever 66 is located between the pulley 38 and the bearing 40, and the axle 36 is located within the slot 84.

As shown in FIG. 1 the elastomer drive belt 56, described above, is entrained between the pulley 60 at the upper end of the link 66 and the pulley 38 secured to the axle 36. The drive belt 56 is twisted such that rotation of the thumb wheel 32 will be transmitted by the elastomer drive belt 56 to the pulley 38 and cause counter-rotation of the axle 36 and the roller 34 secured thereto.

The thumb wheel 32, the lever 66, and the roller assembly 30 are movable between an operative position and an inoperative position. In the inoperative position the lever 66 is biased by the coil spring 82 against the pin 80. The bifurcated lower end of the lever 66 causes the roller assembly 30 to pivot to cause the roller 34 to move in the direction of the arrow 86 away from the film track 12. When a tangential force in the direction of the arrow 88 is applied to the thumb wheel 32 by the projector operator, the lever 66 pivots about axis 74 in the direction of arrow 78 to cause the roller assembly 30 to pivot to cause the roller 34 to move in the direction of the arrow 90 toward the film track 12. The roller 34 passes thru the access port 92 (FIG. 2) formed in the guide surface 22 and comes into surface contact with the filmstrip 20. The tangential force on the thumb wheel 32, in addition to causing the roller assembly to pivot from the inoperative position to the operative position, causes the thumb wheel 32 to rotate. This rotation is transmitted by the elastomer drive belt 56 to the roller 34 which then causes the longitudinal displacement of the filmstrip 20 in the film track 12 toward the sprocket 18. When the tangential force applied to the thumb wheel 32 is removed the coil spring 82 causes the lever 66 and the roller assembly 30 to move to the inoperative position to thereby move the roller 34 away from the film track 12.

While the preferred embodiment of the present invention utilizes a coil spring 82 to bias the lever 66 to the inoperative position, it has been found that the preferred embodiment will operate satisfactorily without the spring 82.

As is readily apparent, the present invention provides a means whereby a projector operator can conveniently cause longitudinal displacement of an overdriven filmstrip in the direction of the sprocket to reengage the filmstrip with the sprocket.

As will be apparent to those skilled in the art, various changes and modifications may be made to the preferred embodiment of the invention described herein without departing from the scope of the invention as determined by the appended claims and their legal equivalent.

I claim:

1. Apparatus for causing a longitudinal displacement of a filmstrip in a filmstrip guide and support means comprising:

pivoted means, and a roller means for rotatably mounting said roller on said pivoted means, and means for pivotally mounting said last recited means to said guide and support means.

said pivoted means movable between an operative position wherein said roller is in contact with a surface portion of said filmstrip and an inoperative position wherein said roller is out of contact with said filmstrip;

manipulatable means rotatably mounted on said pivoted means and operable by an operator;

means connecting said manipulatable means with said roller, whereby operator actuation of said manipulatable means causes said pivoted means to move from said inoperative position to said operative position and to rotate said roller to cause said filmstrip to displace longitudinally in said filmstrip guide and support means.

2. The apparatus claimed in claim 1 further comprising:

means to resiliently bias said pivoted means to position said roller to said inoperative position.

3. The apparatus claimed in claim 2, wherein said bias means is a spring.

4. The apparatus claimed in claim 1, wherein said roller further comprises;

an elastomer periphery.

5. The apparatus claimed in claim 1, wherein said manipulatable means comprises a thumb wheel.

6. The apparatus claimed in claim 1, wherein said connecting means further comprises:

a first pulley connected to said manipulatable means for rotation therewith;

a second pulley connected to said roller for rotation therewith;

belt means entrained by said first and said second pulleys;

whereby rotation of said manipulatable means is transmitted by said first and second pulleys and said belt means to said roller.

7. Apparatus for causing longitudinal displacement of a filmstrip in a filmstrip guide and support means comprising:

a roller for frictional engagement with a filmstrip;

an axle having one end secured to said roller for rotation therewith;

bearing means rotatably supporting said axle intermediate its ends;

said bearing means permitting said axle angular degrees of freedom;

a first pulley secured to the other end of said axle for rotation therewith;

a lever pivoted intermediate its ends;

a rotatably mounted thumb wheel at a first end of said lever;

a second pulley connected to said thumb wheel for rotation therewith;

the second end of said lever embracing said axle;

belt transmission means coupling said first pulley and said second pulley;

whereby a tangential force applied to said thumb wheel causes said lever to pivot to angularly displace said axle to bring said roller into engagement with said filmstrip, with rotation of said thumb wheel causing rotation of said roller to translate said filmstrip.

8. The apparatus claimed in claim 7, wherein said roller includes an elastomer periphery.

9. The apparatus claimed in claim 7, wherein said bearing means is a spherical bearing.

* * * * *